US009064233B2

(12) United States Patent
Woods et al.

(10) Patent No.: US 9,064,233 B2
(45) Date of Patent: Jun. 23, 2015

(54) METHODS AND APPARATUS FOR DEVICE-SPECIFIC ANALYTICS DATA VISUALIZATION

(75) Inventors: Roger J. Woods, Provo, UT (US); Matthew L. Freestone, West Jordan, UT (US); Edward L. Hewett, Crockett, TX (US); Guillaume L. Escarguel, San Diego, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/335,627

(22) Filed: Dec. 22, 2011

(65) Prior Publication Data

US 2014/0019492 A1 Jan. 16, 2014

(51) Int. Cl.
*G06F 17/30* (2006.01)
*G06Q 10/10* (2012.01)
*G06F 17/21* (2006.01)

(52) U.S. Cl.
CPC .............. *G06Q 10/10* (2013.01); *G06F 17/212* (2013.01); *G06F 17/30905* (2013.01)

(58) Field of Classification Search
CPC .......... G06F 17/30905; G06F 17/3089; G06F 17/2247; G06F 17/212; G06F 17/24; G06F 17/272; G06F 17/211; G06F 17/217; G06F 17/27; G06Q 30/02; G06Q 10/063
USPC ......... 707/806, 705, 722, 732, 736, 790, 802, 707/805, 200; 715/744, 745, 746, 747, 717, 715/234, 249, 204; 709/203, 209, 224, 225
See application file for complete search history.

(56) References Cited

U.S. PATENT DOCUMENTS

| | | | | |
|---|---|---|---|---|
| 7,146,416 | B1 * | 12/2006 | Yoo et al. | 709/224 |
| 7,739,658 | B2 * | 6/2010 | Watson et al. | 717/108 |
| 8,010,702 | B2 * | 8/2011 | Farouk | 709/246 |
| 8,122,345 | B2 * | 2/2012 | Chen et al. | 715/249 |
| 8,301,754 | B1 * | 10/2012 | Moon | 709/224 |
| 8,312,079 | B2 * | 11/2012 | Newsome et al. | 709/203 |
| 8,392,841 | B1 * | 3/2013 | Bowden et al. | 715/760 |
| 8,438,219 | B2 * | 5/2013 | Patrawala et al. | 709/203 |
| 2006/0053367 | A1 * | 3/2006 | Chen et al. | 715/513 |
| 2006/0277087 | A1 | 12/2006 | Error | |

(Continued)

FOREIGN PATENT DOCUMENTS

EP 1914634 4/2008

*Primary Examiner* — Jay Morrison
*Assistant Examiner* — Dangelino Gortayo
(74) *Attorney, Agent, or Firm* — Kilpatrick Townsend & Stockton LLC

(57) ABSTRACT

Methods and apparatus for presenting a visualization of content and analytics data for content accessed from one or more devices, where the visualization includes a display of the content as it would appear on a given device. In some cases, an analytics visualization tool displays the content overlaid with analytics data specific to a device and to the content. Additionally, the analytics visualization tool may request a content page from a content server, where the request includes an indication of being a particular device, and in response, a content page is received formatted according to the particular device. The analytics visualization tool may then display the received content page along with analytics data that has been segmented according to the device and according to the content page.

21 Claims, 12 Drawing Sheets

(56) References Cited

U.S. PATENT DOCUMENTS

| | | |
|---|---|---|
| 2007/0022000 A1 | 1/2007 | Bodart et al. |
| 2007/0220419 A1* | 9/2007 | Stibel et al. .................. 715/511 |
| 2008/0046562 A1 | 2/2008 | Butler |
| 2008/0120538 A1* | 5/2008 | Kurz et al. .................... 715/255 |
| 2010/0088234 A1* | 4/2010 | Moore et al. .................... 705/52 |
| 2012/0072850 A1* | 3/2012 | Megiddo et al. .............. 715/745 |
| 2012/0296682 A1* | 11/2012 | Kumar et al. ................ 705/7.11 |
| 2013/0080910 A1* | 3/2013 | Bingell et al. ................ 715/744 |

\* cited by examiner

METHODS AND APPARATUS FOR DEVICE-SPECIFIC ANALYTICS DATA VISUALIZATION

BACKGROUND

For many content providers, an increasingly wide array of devices have become significant drivers of an increase in traffic for the consumption of content. Often, if content is optimized for a particular device, there are corresponding increases in user engagement with the optimized content. For example, if a web site is designed to be easily navigated by a user operating a mobile device, a potential customer may become an actual customer if the desired content is easily found. Similar positive results may be achieved with other devices, such as tablets, wide screen formats, devices with specific screen aspect ratios, or any other device that renders content in a format that may be different from the default format for provided content. In this vein, a valuable tool for content developers and/or marketers is analytics information to provide insight into how a user interacts with provided content, in order to improve the user experience of consumers of the provided content.

SUMMARY

In one embodiment, an analytics visualization tool is provided that displays content as the content would be rendered on a specific device, where in addition to the displayed content, analytics data corresponding to the device and/or the content is displayed along with the displayed content. In some embodiments, content and analytics data are presented according to device category, or according to some other pre-defined or user-defined categorization of the analytics data. In some embodiments, the content may be composed of various individually accessible elements, and in such a case, the analytics data may be overlaid corresponding to each accessible element for which there is analytics data. The overlaying of the analytics data on top of the displayed content provides a visualization of the analytics data for a specific device, and in this way providing a developer with guidance on improving the accessibility of the content for device users.

In some embodiments, the analytics visualization tool may allow a user to enter a selection of a content page. In addition, the analytics visualization tool may allow the user to enter a selection of a device from among a plurality of devices. The analytics visualization tool may then determine a version of a content page from among a plurality of versions of content pages, where the version of the content page is based on the selected device. Given the version of the content page, the analytics visualization tool may cause at least a portion of the version of the content page to be displayed along with one or more elements of analytics data corresponding to the device and content page.

Figure 1:
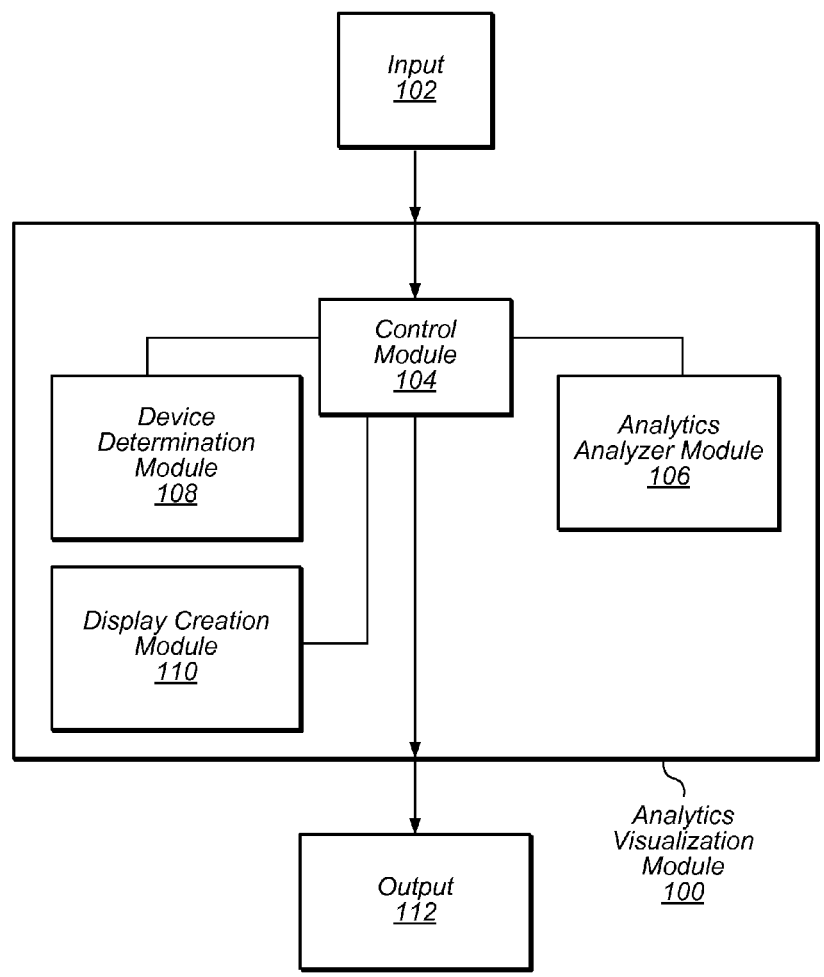
FIG. 1 illustrates an analytics overlay visualization module, according to some embodiments.

While the invention is described herein by way of example for several embodiments and illustrative drawings, those skilled in the art will recognize that the invention is not limited to the embodiments or drawings described. It should be understood that the drawings and detailed description are not intended to limit the invention to the particular forms disclosed, but on the contrary, the intention is to cover all modifications, equivalents and alternatives falling within the spirit and scope of the present invention. The headings used are for organizational purposes only and are not meant to be used to limit the scope of the description. As used throughout this application, the word "may" is used in a permissive sense (meaning "having the potential to"), rather than the mandatory sense (meaning "must"). Similarly, the words "include", "including", and "includes" mean "including, but not limited to."

DETAILED DESCRIPTION OF EMBODIMENTS

Various embodiments are presented of an analytics visualization tool for presenting a visualization of analytics data for content accessed from various devices, where the visualization includes displaying the content as it would appear on a given device along with analytics data specific to the device.

Increasing numbers of devices, with different screen sizes, different aspect ratios, screen resolutions, and different browsers are accessing content from web sites, content sites, and other sources. Given the broad variety of devices accessing content and the significant amount of traffic generated from a variety of device users, developers providing an engaging experience for particular device users may be more successful than developers who neglect such users. However, while developers may have raw analytics data that includes information describing quantitative aspects of particular device users interacting with a content site, developers do not currently have access to software tools that present a developer, simultaneously, with a visualization of how a specific device accesses content through the use of a display of content according to the device, where the display may also include analytics data that is segmented according to both the content and device.

Providing a developer with both a visualization of how content appears for a given device along with analytics data specific to the device allows a user to better understand how content is being consumed and engaged, and this understanding allows a developer to more effectively tailor content to any given device. Along with developers, the understanding of how content is being consumed may be beneficial to marketing teams, analysts, content site editors, and user experience designers.

Further, if a developer can understand how different content is consumed according to users of different devices, different versions of content may be tailored to more effectively engage users of various devices. In other words, providing a visual guide tailored to specific devices allows developers to increase engagement through fine tuning the experience for a given device. Engagement may be measured from actions such as clicks on links or images, downstream revenue as a result of clicks, or any other downstream success events as defined according to a given content provider.

In one embodiment, a user may install a plugin to modify a web browser to provide the abilities described above. Such a modified web browser may be referred to as an analytics visualization tool. Further, the user may have access to analytics data for a given content site, for example, the user may log in to an analytics server corresponding to the content site. In one example, the plugin may provide the user with the ability to log in through a user interface, and the modified web browser may handle communications with the analytics server. In other embodiments, the analytics information may be stored locally, and the modified web browser may access the analytics information locally. Other methods for accessing the analytics information are possible, and so long as analytics data can be accessed, the disclosed embodiments may operate successfully. In other embodiments, a standalone application may be developed to provide for the functionality described within the various disclosed embodiments.

Figure 10:
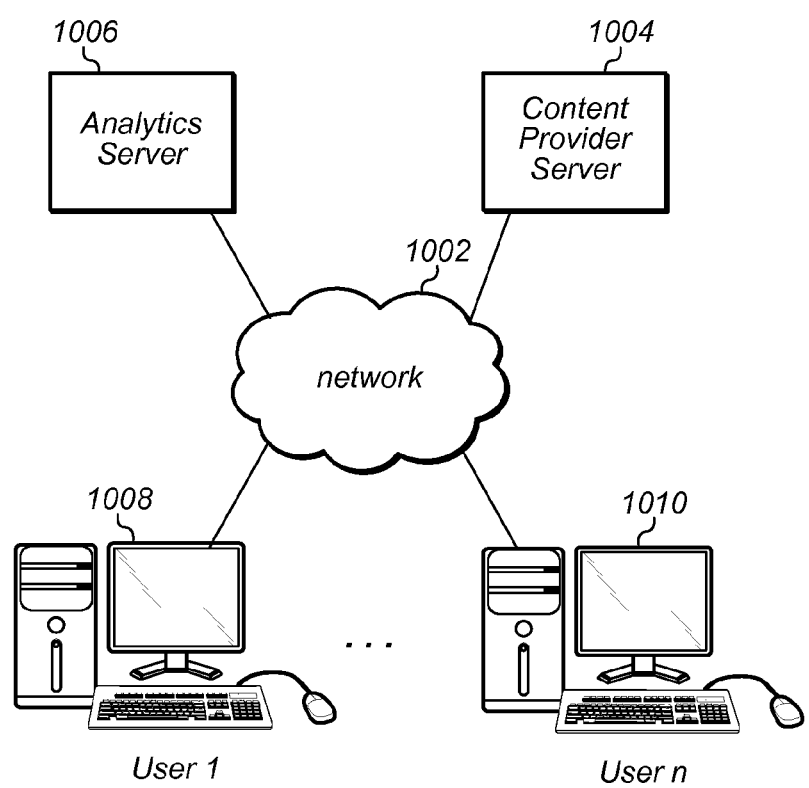
FIG. 10 depicts an illustration of a network environment that may be used to collect analytics data, according to some embodiments.

Collection of analytics data may be performed in a variety of ways, and the disclosed embodiments of an analytics visualization tool do not depend on any particular method for the collection of analytics data. In some cases, log files may be created on a content provider server to record every transaction made between a device consuming content and the server providing the content, such as between User 1008 and Content Provider Server 1004 in FIG. 10, or between User 1010 and Content Provider Server 1004. The log files created may be periodically or aperiodically transmitted to an analytics server, such as Analytics Server 1006 in FIG. 10. Another approach that may be used is page tagging or web bugs, where the request for a content page may result in a content page that, upon being displayed by a user's internet-enabled application, may initiate tracking of the user's navigation habits and provide the tracking information to an analytics server. In some cases, an image request indicated within a requested page serves as the catalyst for the execution of a script used to collect the analytics data. The analytics data is reported along with the image request made to the analytics server. The actual requested image may be invisible to the user, such as a transparent 1×1 pixel, displayed within the content page. Some types of analytics data collected may be hits, or a request for a file from a web server, page views, visits, sessions, unique visits, unique visitors, repeat visitors, new visitors, impressions (of advertisements or other content), singletons (visits where only a single page is viewed), bounce rate (percentage of singleton visits), exit percentage, visibility time, session duration, page view duration, engagement time (amount of time a visitor is on a page), page views per session, click paths, clicks, browser type, display size, display resolution, among other metrics.

In one embodiment, once a user has navigated to, specified, or otherwise provided the analytics visualization tool with a content page, the user may, in response, be provided with some or all of the devices that have visited the content page. From a report of available devices, the user may select a particular device. Once a device has been selected, in response, the analytics visualization tool may display the content page as the content page would be rendered on the given device. In other words, the user may see the content page displayed as if the user were seeing the content page on the actual, physical device. In some embodiments, the form factor of the device, or an outline, tracing, or other indication of the form factor may be displayed with the content page. Further, in response to the selection and determination of a device, the analytics data may be automatically segmented according to the device. As a result of the segmentation of the analytics data, a user may view reported metrics corresponding to the device, such as content page flows and other content page metrics. The segmented analytics data may be displayed to the user in a separate window panel, or displayed in one or more visual overlays of the displayed content page, or both. In this way, in one step, a user is able to view a visualization of analytics data for a device and content page in a way that simulates the experience a user would have if viewing the content page from the device.

In some embodiments, once a user has navigated to, specified, or otherwise provided the analytics visualization tool with a content page, the user may, in response, be provided with devices for which the content page has been formatted, whether or not any of the devices have accessed the content page.

In some embodiments, a user may define specifications corresponding to a prototype of a device that does not yet physically exist. Further, the user may assign the analytics data for existing devices that are comparable to be displayed, or the user may assign the analytics data for multiple devices, or a class of devices to be displayed. In this way, the user may tailor content for the as-yet unreleased device.

A device may include mobile devices, such as cellular phones, tablets, internet-capable music players, traditional desktop monitors, monitors with specific screen configurations or characteristics, and more generally, any hardware, software, or combination of hardware and software capable of displaying content. Further, a device may be considered to be a particular combination of a hardware device in combination with a particular software application for accessing content. For example, a particular brand of mobile phone running a particular brand of internet browser may be considered as a different device from the same brand of mobile phone running a different brand of internet browser. In some cases, a device may be entirely specified by the type of software. For example, the analytics visualization tool may be used to design content for any device running a particular type of browser, regardless of the underlying hardware on which the browser executes. In this case, a device is defined entirely by the particular type of browser.

In some embodiments, once the user is presented with a display of the content page and the corresponding segmented analytics data, the user may compare the segmented analytics data against other devices. The user may also compare different displays overlaid with analytics data for more than one device. Further, the user may even compare the segmented analytics data against analytics data for desktop computers, and compare displays overlaid with analytics data.

In the following detailed description, numerous details are set forth to provide a thorough understanding of the claimed subject matter. However, it will be understood by those skilled in the art that the claimed subject matter may be practiced without these specific details. In other instances, methods, apparatus or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining", or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Example Embodiment: Analytics Visualization Module

FIG. 1 illustrates an embodiment of an Analytics Visualization Module 100. The functionality of the Analytics Visualization Module 100 may be incorporated into a plugin for an analytics tool or a web browser, or natively supported within a dedicated analytics visualization tool or browser.

In some embodiments, to begin, Control Module 104 may receive input 102, which may include an indication of a content page, such as identifying information for a web page such as a uniform resource locator (URL). Given an indication of a content page, Analytics Analyzer Module 106 may segment analytics data according to the content page. For example, given analytics data corresponding to a content site, the analytics data may contain information describing various aspects of user engagement with each of the content pages within the content site. The analytics data may include the number of clicks on each link in a content page, the type of device accessing the content page, the duration of time spent on the page, and any other measures of user engagement with the content page.

Based on a segmentation of analytics data according to the content page, one or more devices that have accessed the content page may be determined and provided to a user. A further note on segmentation is that segmentation may perform a filtering of the analytics data to remove data not relevant to the segmentation criteria or criterion, and in this way, through a single action, the selection of a content page, the Analytics Analyzer Module 106 may tailor the analytics data to the content page.

Device Determination Module 108 may determine the one or more devices. The one or more devices determined may be provided to Control Module 104, which may in turn provide the one or more devices as output 112 to be displayed to a user.

Presented with one or more devices that have accessed the content page, a user may select one or more devices in order to further segment, or narrow, the analytics data that has already been segmented according to the content page. A user selection of one or more devices may be received as input 102 into Control Module 104. Control Module 104 may determine one or more devices based on information received in input 102 that identifies the one or more devices.

Given a determination of the one or more devices, Control Module 104 may provide the determined one or more devices to Analytics Analyzer Module 106. Analytics Analyzer Module 106 may, in response to receiving the determined devices, further segment the previously segmented analytics data, this time, according to the one or more devices. Upon segmenting, Analytics Analyzer Module 106 may provide the segmented analytics data to Control Module 104

At the point that Control Module 104 receives the segmented analytics data from Analytics Analyzer 106, Control Module 104 may provide, the content page, the determined devices, and the segmented analytics data to Display Creation Module 110. Display Creation Module 110 may generate a display of at least a portion of the content page overlaid with one or more elements of the segmented analytics data, where the display simulates a rendering of the portion of the content page as it would be seen if rendered on the device. The display generated may be provided to Control Module 104, which may in response, transmit the generated display as output 112. In this way, a user may see a visualization of the content page as it would be displayed on a device that includes an overlay of analytics data segmented according to the content page and the device.

As evident in the above discussion, during different phases of execution, Analytics Visualization Module 100 may receive input 102 indicating particular content that has been accessed from a device, or analytics data corresponding to one or more pieces of content. In other cases, input 102 may include user input indicating a selection of a device. The various types of input 102 may depend on the processing step being performed within Analytics Visualization Module 100.

Example Embodiment: Visualization of Device-Specific Analytics Data

Figure 2A:
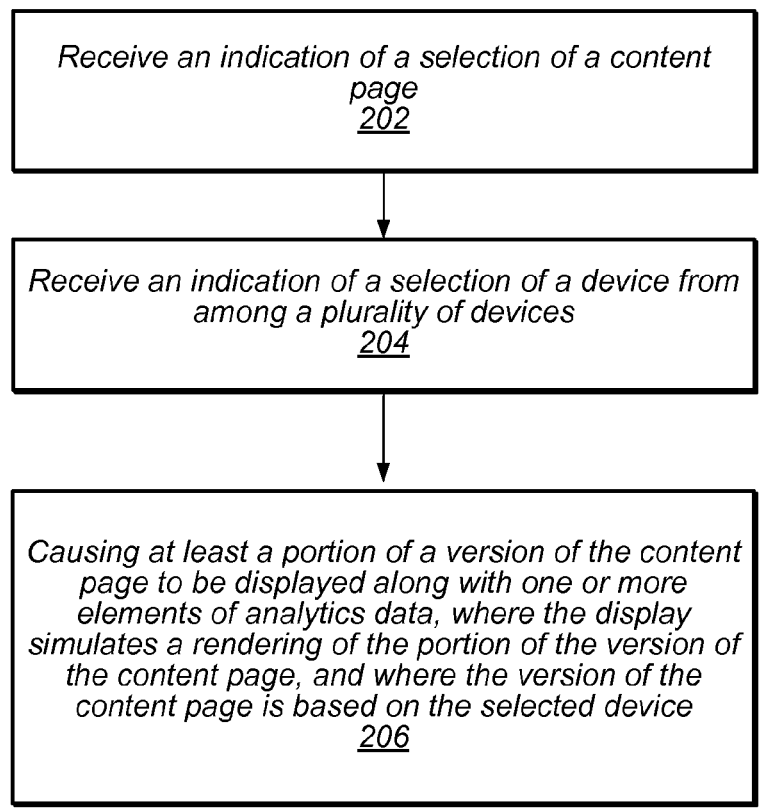
FIG. 2A is a flowchart of an embodiment of displaying a portion of a content page overlaid with elements of device-specific segmented analytics data, according to some embodiments.

FIG. 2A illustrates a flowchart highlighting certain processing steps that may be present in an embodiment of an analytics visualization tool. In some embodiments, a user, from a user interface of an analytics visualization tool, may enter information identifying a content page. As discussed above, the user may be interested in understanding how the content page is experienced from one or more devices in order to optimize elements of the content page to improve user engagement with the content page or to increase some other metric of success, such as sales or traffic.

In some embodiments, a user may first log in to the analytics visualization tool to access the content pages and corresponding analytics data. The system storing the content pages or the system storing the analytics data may be local, accessed remotely on a remote server, or accessed on a cloud computing environment.

In this example, to begin, a user may, from an interface of the analytics visualization tool, select a particular content page for which the user may wish to view analytics data specific to a device. The analytics visualization tool receiving an indication of a content page as a result of a user selection of a particular content page is reflected in step 202.

In this example, a user may also, from the interface of the analytics visualization tool, select a particular device for which the user may wish to view the content page, as reflected in step 204. In some embodiments, the order in which a user selects a content page and device is interchangeable, with neither selection being dependent on the other selection.

At this point, the analytics visualization tool may cause at least a portion of a version of the content page to be displayed, as reflected in step 206. In some cases, the display simulates a rendering of at least the portion of the version of the content page as the portion of the version of the content page would be rendered on the selected device.

In this example, one or more elements of analytics data may also be caused to be displayed with the portion of the version of the content page. In some embodiments, the one or more elements of the analytics data are segmented according to the selected device and according to the content page.

In this example, the version of the content page may be among a plurality of versions of content pages, and the particular version of the content page displayed may depend on the device selected in step 204. Further, a version of a content page may exist for each device. However, in some cases, there may be not be a one-to-one mapping of a device to a version of a content page. For example, for a particular device with a particular operating system and browser, a version of a content page for a different device with the same operating system and browser may be determined. In this case, there are fewer versions of a content page than there are devices. In this case, if there is no content version for a particular device, it may be determined that a version of the content page may be substituted based on similarities between the particular device and another device. For example, the similarities may be nearness in the device generations, or similarity in device class, or similarity in screen sizes or resolutions.

Example Embodiment: Visualization of Device-Specific Analytics Data

Figure 2B:
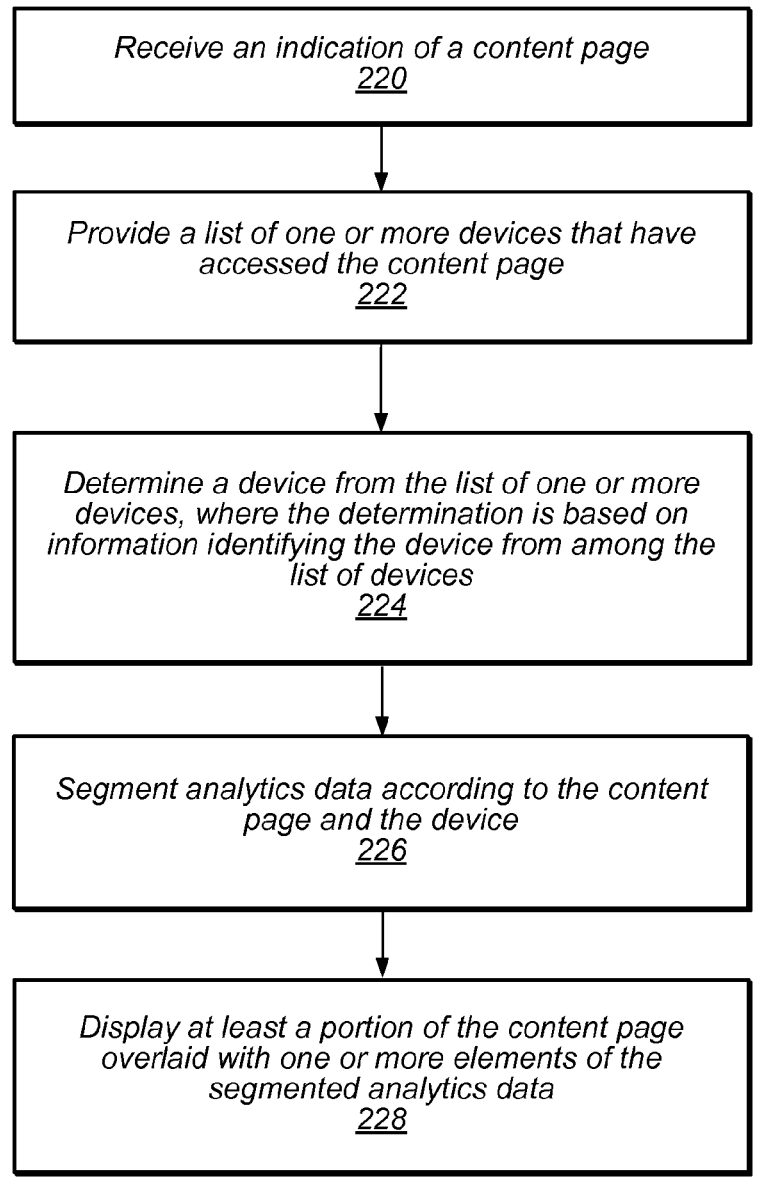
FIG. 2B is a flowchart of an embodiment of displaying a portion of a content page overlaid with elements of device-specific segmented analytics data, according to some embodiments.

FIG. 2B illustrates a flowchart highlighting certain processing steps that may be present in an embodiment of an analytics visualization tool. In some embodiments, a user, from a user interface of an analytics visualization tool, may enter information identifying a content page.

A user of the analytics visualization tool may be responsible for the design and maintenance of one or more content sites. Therefore, to begin, a user may, from an interface of the analytics visualization tool, select a particular content page for which the user may wish to view analytics data specific to a device. The analytics visualization tool receiving an indication of a content page as a result of a user selection of a particular content page is reflected in step 220.

In this example, in response to receiving an indication of a content page, the analytics visualization tool may determine one or more devices that have accessed the content page, as reflected in step 222. This determination of the one or more devices may be performed from segmenting analytics data corresponding to the content page according to the devices that have accessed the content page. In other words, the segmented analytics data contains information identifying each device that has accessed the content page, and the analytics visualization tool may provide to the user one or more devices that have accessed the content page.

In some embodiments, the one or more devices that have accessed the content page may be displayed to the user in the form of a drop down menu of devices. In other embodiments, one or more devices may be displayed in a panel of the analytics visualization tool in response to the determination of the content page. In other embodiments, the drop down menu of devices having accessed the content may be displayed along with an indication of traffic corresponding to a given device. For example, the name of a device in the drop down menu may be displayed and next to the name, a ranking of the device may also be displayed. In some cases, the ranking may be in parenthesis, in a different font or color, or otherwise distinguished from the device name. In some embodiments, the ranking may be determined based on the device that has most frequently accessed the content page, or based on the device that corresponds to the greatest amount of sales, or based on some other data analytics metric, or based on a user-defined metric. In some embodiments, the order in which the devices are displayed in the drop down menu may be determined based on the ranking value.

In some embodiments, the one or more devices determined to have accessed the content page may be arranged in groups, according to some common characteristic. For example, devices with a common screen resolution and size may be grouped together with an indication that the devices in the group share a common screen resolution and size. Similarly, devices with a common operating system may be grouped together, or devices with only a common screen size, or devices accessing the content page with the same browser. In the case where a group of devices is selected, a representative device may be used to generate the display according to the device. In other embodiments, the user may select a device, on which to base a generated display, from the group of devices. In other embodiments, the analytics visualization tool may automatically select a particular device from the group based on a ranking such as traffic, for example. In other embodiments, a generated display for each device in the group of devices may be generated if the generated displays are different. In other words, if there are five devices in the group and four of the devices correspond to a similar or equal generated display and only one device has a different or significantly different display information, then two display outputs would be generated, one display output corresponding to the four devices and another display output corresponding to the fifth device. In cases where multiple devices are selected as a group, the analytics data for the group of devices may be aggregated. In other cases where multiple devices are selected as a group, the analytics data may be displayed in different areas of an overlay.

In this example, once a user is presented with one or more devices that have accessed the content page, a user may make a selection of one or more of the devices presented. The analytics visualization tool may then determine which device or devices from the one or more devices presented to the user have been selected, as reflected in step 224.

In this example, given the content page and given the determination of one or more devices, the analytics visualization tool may segment the analytics data according to the content page and the one or more devices, as reflected in step 226. The segmentation is automatically performed in response to the user selections of the device or devices and the user selection of the content page. In this manner, without ever performing a query or otherwise directly manipulating the raw analytics data, a user may filter a set of analytics data according to the content page and according to the one or more devices selected.

In this example, given the segmented analytics data and the determination of the one or more devices, the analytics visualization tool may generate one or more display outputs, as reflected in step 228. In the case where a single device has been determined, the generated display includes at least a portion of the content page, which includes an overlay of one or more elements of the segmented analytics data.

The analytics visualization tool may generate a display of the content page in different ways. In one case, the analytics visualization tool may keep a table to store information for each device, where the table also stores information usable to generate a display, such as display configurations for each device. The display configuration information may include the pixel width and pixel height of a particular device, along with information on whether landscape modes are available.

In some embodiments, the generation of a display of the content page may include requesting the content page in the guise of the particular device selected for which the generated display may correspond. In other words, when the content page is requested, the request is made as if from a particular device, and in response to believing the request is from a particular device, the content page is returned formatted according to the particular device. In this way, the content page returned may be displayed according to the particular device the content page provider interpreted as making the request for the content page. One example for how this works in practice may be for the analytics visualization tool to make a request for a content page from a content server and within the request, the analytics visualization tool may provide user agent information that specifies a particular device. In this example, user agent information provided to the content server may include a web browser type, a device type, an operating system type, and version information for the browser, operating system, and/or device. The content server, upon receiving user agent information identifying a particular device, browser and version information may then decide on which version of a requested content page to return based on the user agent information. In this example, the analytics visualization tool may present itself as any supported device to a content server when requesting content in order to receive content that is appropriately formatted for a given device.

An overlay of analytics data onto a display of a content page may be drawn as a shaded area over a link within the content page. In some cases, instead of a shaded area, some other visual indication may be drawn. In other cases, the overlay area may not be visually distinguished, however, cursor activity over the overlay area may result in a display of overlay data. The one or more elements of segmented analytics data overlaid onto the display of the content page may be pre-defined, user-defined, or both. In some embodiments, the overlay information may default to the number of clicks for a link, and this number may be displayed in an area of the overlay image drawn over the link in the generated display. In other embodiments, multiple elements of the overlay data may be displayed in the area of the overlay image for a link. For example, in the case where an overlay image is a shaded box, one element of the analytics data may be displayed in the upper right corner and another element of the analytics data may be displayed in the lower right corner of the shaded box.

In some embodiments, the overlay may be drawn in a shaded color specified according to a user, or in a pre-defined color. Further, through a user interface control, a user may choose to show bottom ranking or top ranking values within the overlay. In some cases, a user may also select a number of overlays to draw. In some cases, the color for an overlay may be normalized. For example, if color normalization is enabled, the first 30 (or some other pre-defined value) overlays may be displayed in equidistant gradients of a selected primary color, and other ranked links with overlays may have the same base overlay color gradient. Further in this example, if color normalization is disabled, the intensity of the color of the overlays may be scaled based on the popularity (or some other pre-defined metric) of the link corresponding to the overlay.

If the screen resolution of a device is less than or equal to the screen resolution of the display being used with the analytics visualization tool, then the generated display may be embedded within a display of the form factor of the device, where the display of the form factor is to scale with the device. However, some devices have a screen resolution that is higher than the display being used for the analytics visualization tool, and in such a case, the display may be reduced to the screen resolution of the display in order to preserve the 1:1 scale display of the form factor of the device to the physical device. In other cases, the analytics visualization tool may preserve the device screen resolution in the generated display if the dimensions of the generated display are increased. The screen resolution of the device may be preserved in the sense that each pixel of the device may be displayed. However, while a pixel may be displayable within a certain area of the device, a pixel in the display may be displayable in a larger area. This difference in area accounts for the increased dimensions of the generated display if the screen resolution is preserved.

Example Embodiment: Visualization of Device-Specific Analytics Data

Figure 3:
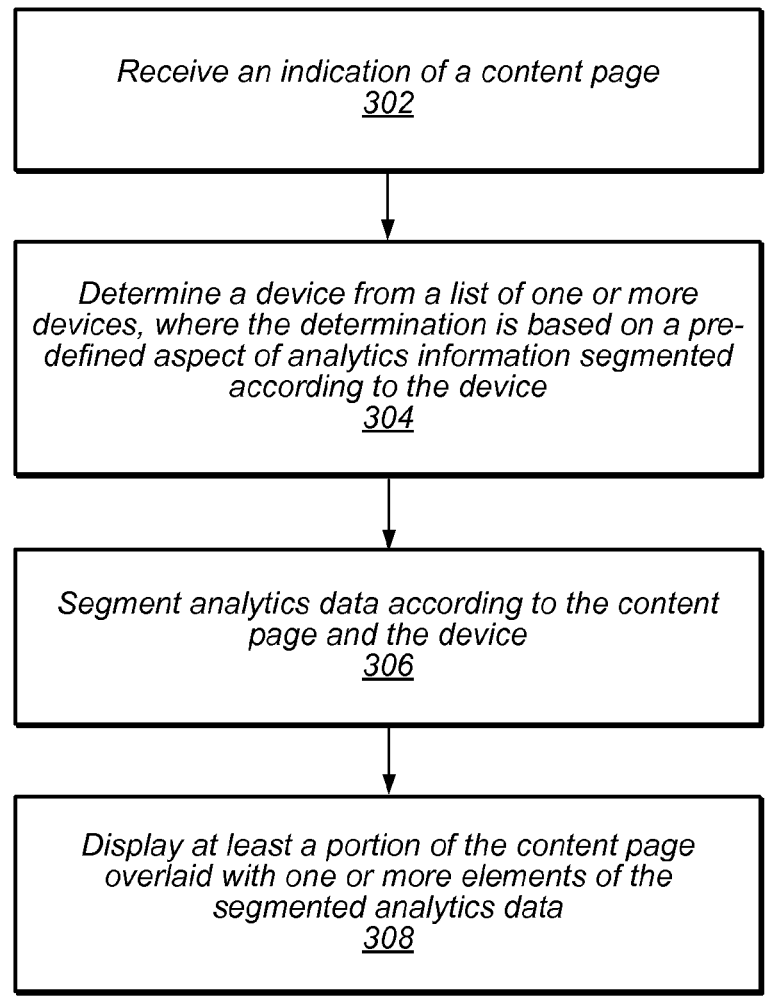
FIG. 3 is a flowchart of an embodiment of displaying a portion of a content page overlaid with elements of device-specific segmented analytics data, according to some embodiments.

FIG. 3 illustrates a flowchart highlighting certain processing steps that may be present in an embodiment of an analytics visualization tool. Similar to the process depicted above with regard to the steps of the flowchart for FIG. 2B, the flowchart of FIG. 3 depicts receiving an indication of a content page, as reflected in step 302.

However, instead of providing one or more devices that have accessed the content page, as in step 222 of FIG. 2B, the analytics visualization tool may automatically determine a device from the one or more devices that have accessed the content page, as reflected in step 304. Further, in different embodiments, the determination of the device may be based upon different factors. In one case, a determination of a device may be based upon a pre-defined aspect of the analytics data corresponding to the content page, for example, number of content page visits from a particular device. In other words, if a particular device is the type of device with more page visits of the content page than any other device, then the analytics visualization tool may automatically select the particular device. In other cases, a different element of the analytics data may be used as the basis for determining a device, such as devices that have visited the content page that correspond to the greatest number of sales. In other cases, different metrics may be used as a default basis for determining a device, or a user may set a configuration or preference setting to define a metric to be used as the basis for an automatic determination of a device. In some embodiments, pre-defined or user-defined combinations of various elements of the analytics data may be used as the basis for determining the device.

The last two steps in this embodiment are similar to the last two steps of the embodiment described in FIG. 2B. Given a determination of a device and the indication of a content page, the analytics data corresponding to the content page may be segmented according to the device, as reflected in step 306.

In this example, at this point, the analytics visualization tool has analytics data that has been segmented according to a content page and according to a device. Within a display area of the analytics visualization tool a display of at least a portion of the content page may be drawn, where the display includes one or more elements of the analytics data overlaid on top of the display of the portion of the content page, as reflected in step 308.

In some embodiments, the overlay area that is part of the generated display may include a default selection of analytics data, such as a ranking of the link, where the ranking is drawn within the overlay. In other embodiments, a user may select one or more elements of the analytics data to be included in the overlay image. In some embodiments, the overlay image may include analytics data that does not correspond to the content page and the device. For example, in some cases, the overlay image may include a ranking value for a corresponding link in the content page, where the ranking value corresponds to the determined device. However, in this example, the overlay image may also include an overall ranking value for the link that corresponds to a ranking for the link across all devices that have accessed or clicked on the link. In this example, the information may be presented with a display of "device rank: X" in a corner of the overlay image, and displaying "overall rank: Y" in another corner of the overlay image, where X and Y are ranking values extracted from the analytics data. This contrasting information may provide a developer with insight as to how a given link ranks on one device when compared to all other devices.

In some embodiments, the overlay values that are drawn over a display for a particular device may include analytics data for other devices. For example, analytics data for a particular device for which the display is generated may include analytics data for the particular device and content page, and in a separate area of the overlay, the analytics visualization tool may drawn in analytics data for a different selected device. In this way, a user may see how the analytics data for the device corresponding to the generated display compares to another device. In this embodiment, through a user interface window, the user may select the contents and layout of the information included in a drawing of the overlay.

In some embodiments, the overlay values may be updated in real time. In other words, as the analytics data is updated, any corresponding changes to the already displayed analytics data in the overlay is updated. In other cases, a fixed set of analytics data may be used to prevent any changes to the analytics data being seen. In other cases, a user may specify other conditions on the analytics data within the overlay, such as a fixed data range specifying a beginning and end date, or a relative data range, such as the previous 3 months, without specifying a beginning or end date.

Example Embodiment: Analytics Visualization Tool

Figure 4:
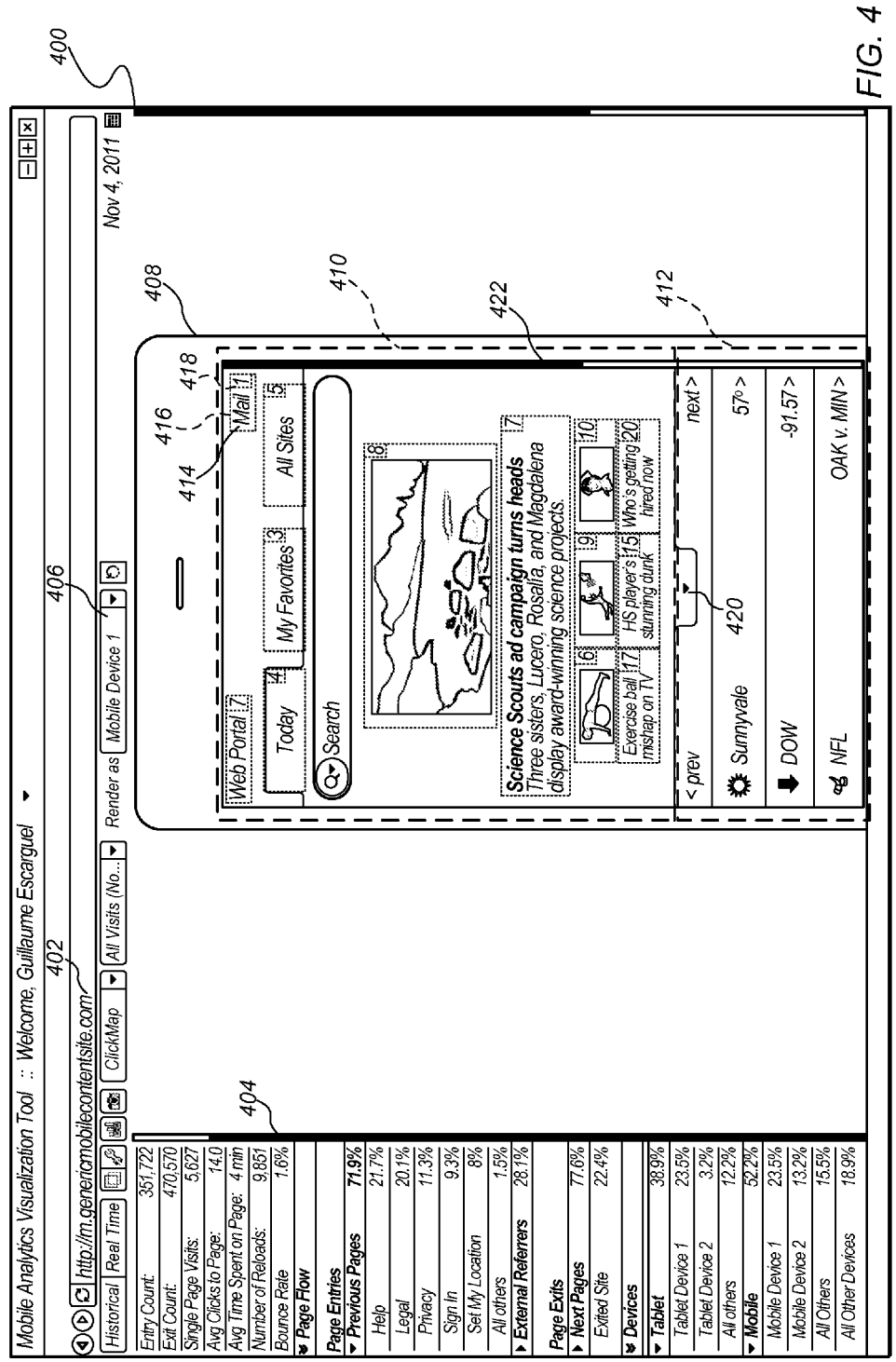
FIG. 4 depicts an illustration of an analytics visualization tool displaying content according to a specific device, according to some embodiments.

FIG. 4 depicts an illustration, according to one embodiment, of a display of a content page overlaid with analytics data according to a device, where the display may be generated within an embodiment of an analytics visualization tool. The user interface window of this embodiment of the analytics visualization tool is depicted as element 400.

As depicted from element 402 of this embodiment, a user may enter a content page to be displayed and for segmenting analytics data. Panel 404 illustrates varies pieces of analytics data, including a breakdown of data according to the types of device such as a tablet or mobile device. Also depicted within analytics data panel 404, under "Page Flow", is a breakdown of how a page was reached, "Page Entries", and how a page was exited, "Page Exits." At the top of the panel is an overview of various other aspects of the analytics data collected for the given content page such as page visits, average clicks to the page, average time spent on the page, the number of reloads, and the bounce rate. As discussed above, each of these elements of the analytics data may be used to specify overlay information to display in a generated display of the page.

As depicted from element 406 of this embodiment, Mobile Device 1 has been selected as the device according to which a display may be generated. A user may choose to display a snapshot that reflects a fixed point in time, or the user may choose to generate a constantly updated display that is regenerated periodically or aperiodically, or after each update of analytics data, or after a pre-defined number of updates to the analytics data corresponding to the page.

As depicted from element 408 of this embodiment, the form factor of the device has been chosen to be displayed. The form factor of a device may be considered the casing or the shape and dimensions of a device. In some cases, the form factor is not displayed and only the screen area of the device is displayed.

Element 410 of this embodiment depicts a dotted bounding box of the screen area within which the content page is displayed on Mobile Device 1. Element 412 of this embodiment depicts a dotted bounding box of the screen area within which other aspects of the operating system of Mobile Device 1 are displayed, such as a stock indicator, the weather, and an indication of a game. Given a generated display of how the content page is to be rendered on Mobile Device 1, the developer may realize that only certain portions of the content page may be visible, while certain areas of the screen space of Mobile Device 1 may be dedicated to other visual elements. This information may help the developer better utilize the available screen space within which the content page is to be displayed.

In some embodiments, the display of the screen area of the device may be interactive. For example, elements 410 and 412 depict portions of the screen that may be displaying a content page and another portion may be displaying visual elements of the operating system. However, if the operating system of the device allows a user to increase or decrease the screen area dedicated to displaying the content page, then a similar increase or decrease may be produced within the display of the device. For example, if tapping, clicking, or otherwise selecting the tab of element 420 the device may increase the display area for the content page, then a developer, from the analytics visualization tool, may similarly click or select the tab element to increase the display area of the content page. In this way, the developer may gain a fuller appreciation of which parts of the content page are visible under different conditions on a given device. To display different part of the content page, scroll bar 422 may also be manipulated within the analytics visualization tool as it might be manipulated on the actual device.

In some embodiments, to achieve the interactive navigation of the generated display, the analytics visualization tool may emulate the operating system of a particular device through the creation of a virtual machine instance. In such an embodiment, a user may interact with the emulated device operating system as if operating the physical device. In other embodiments, a user may simply wish to be able to navigate links, and may only enable link navigation.

Similarly, within the display of the device in the analytics visualization tool, a developer may click on a link, such as link 414, in order to bring up another content page to be displayed. Given that the device would have already been specified, the overlay analytics data can immediately be segmented according to the device and according to the content page reached from the link. In this way, a developer may navigate through a series of content pages while viewing analytics data overlaid on top of any displayed content pages.

Element 414 depicts a "Mail" link within this display of a content page in this embodiment. The dotted bounding box 416 represents an overlay and element 418 represents a ranking value corresponding to this overlay. In this case, the ranking value of 1 indicates that the "Mail" link is the most selected within the content page. In some cases, the overlay area 416 may be displayed as a shaded area over the link. In other cases, the overlay may be visually depicted in other ways, including the use of user-defined overlay images or colors or patterns.

The remaining links within display area 410 of Mobile Device 1 are similarly drawn with dotted boundary boxes around them, indicating an overlay, and in the top right corner of each overlay is displayed a ranking value determined from the analytics data.

Figure 5:
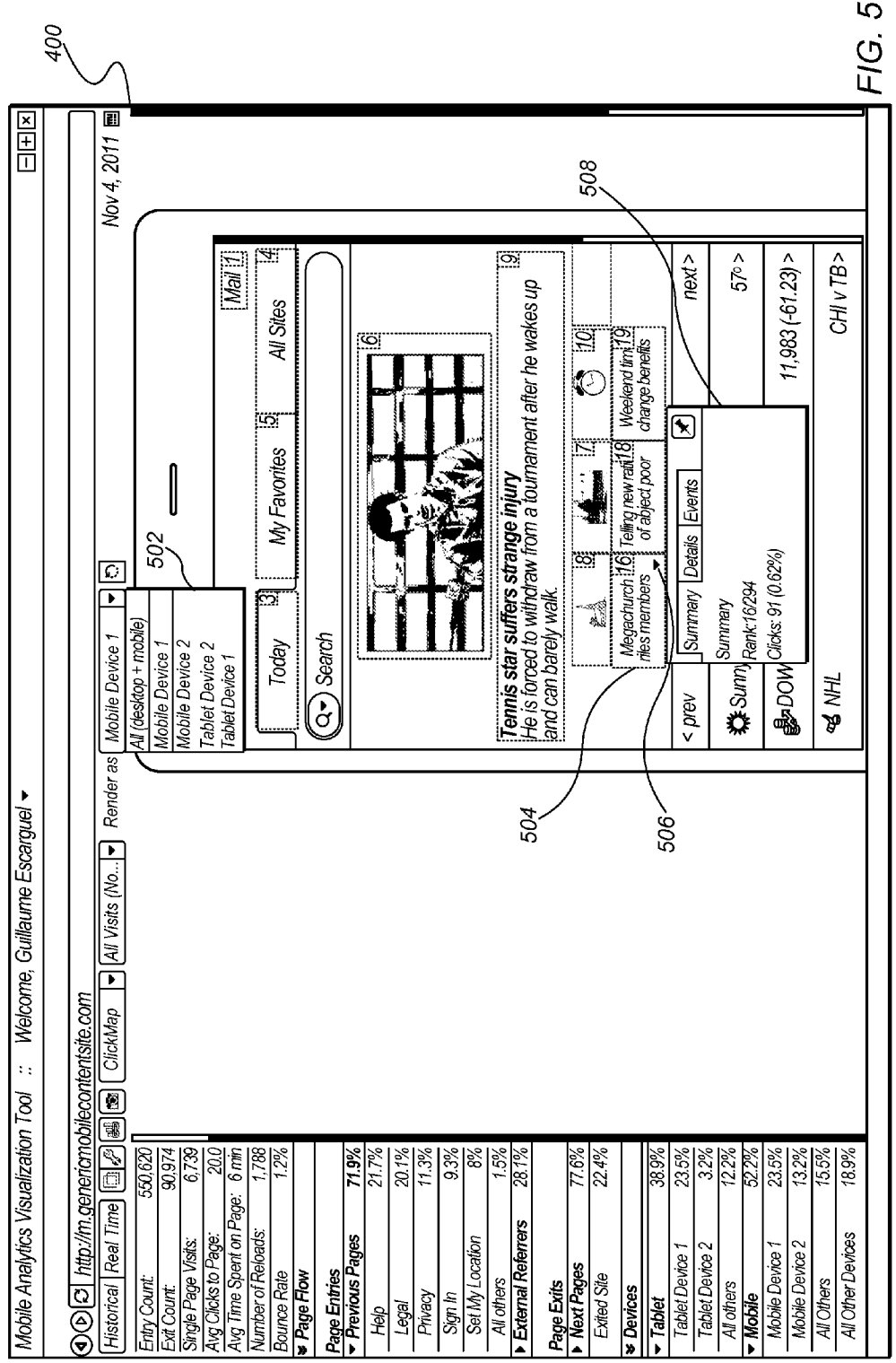
FIG. 5 depicts an illustration of an analytics visualization tool displaying a drop down menu with one or more devices, according to some embodiments.

FIG. 5, similar to FIG. 4, depicts an illustration, according to one embodiment, of a display of a content page overlaid with analytics data according to a device, where the display may be generated in an embodiment of an analytics visualization tool.

As depicted from element 502 of this embodiment, a user may select from a drop down menu any of the one or more devices. Upon receiving an indication of a selection of a particular device, the analytics visualization tool may, in response, segment the analytics data according to the particular device.

As discussed above in regard to overlays, a dotted bounding box in FIG. 5 is representative of an overlay of analytics data. In the actual analytics visualization tool, the overlay may be visible as a shaded area, or visible in some other distinct manner. In the overlay 504, represented as a dotted bounding box, a ranking value of 16 has been drawn in the upper right corner of the overlay. Further in this example, for overlay 504, a user may invoke a popup window represented as window element 508. The popup window may be invoked in response to hovering a cursor over overlay 504, or the popup window may be invoked in response to a click on a user interface icon such as icon 506.

Window element 508 may include several tabs corresponding to further aspects of the analytics data corresponding to the analytics data already segmented according to Mobile Device 1 and the content page. In this example, window element 508 includes a "Summary" tab that includes the ranking value in the context of the total number of values (264) and also includes the number of clicks on the link (91) corresponding to the overlay, where the percentage of clicks with respect to the content page (0.62%) is in parenthesis next to the percentage. Other tabs in this example include a "Details" tab and an "Events" tab, which provide further aspects of the segmented analytics data.

Figure 6:
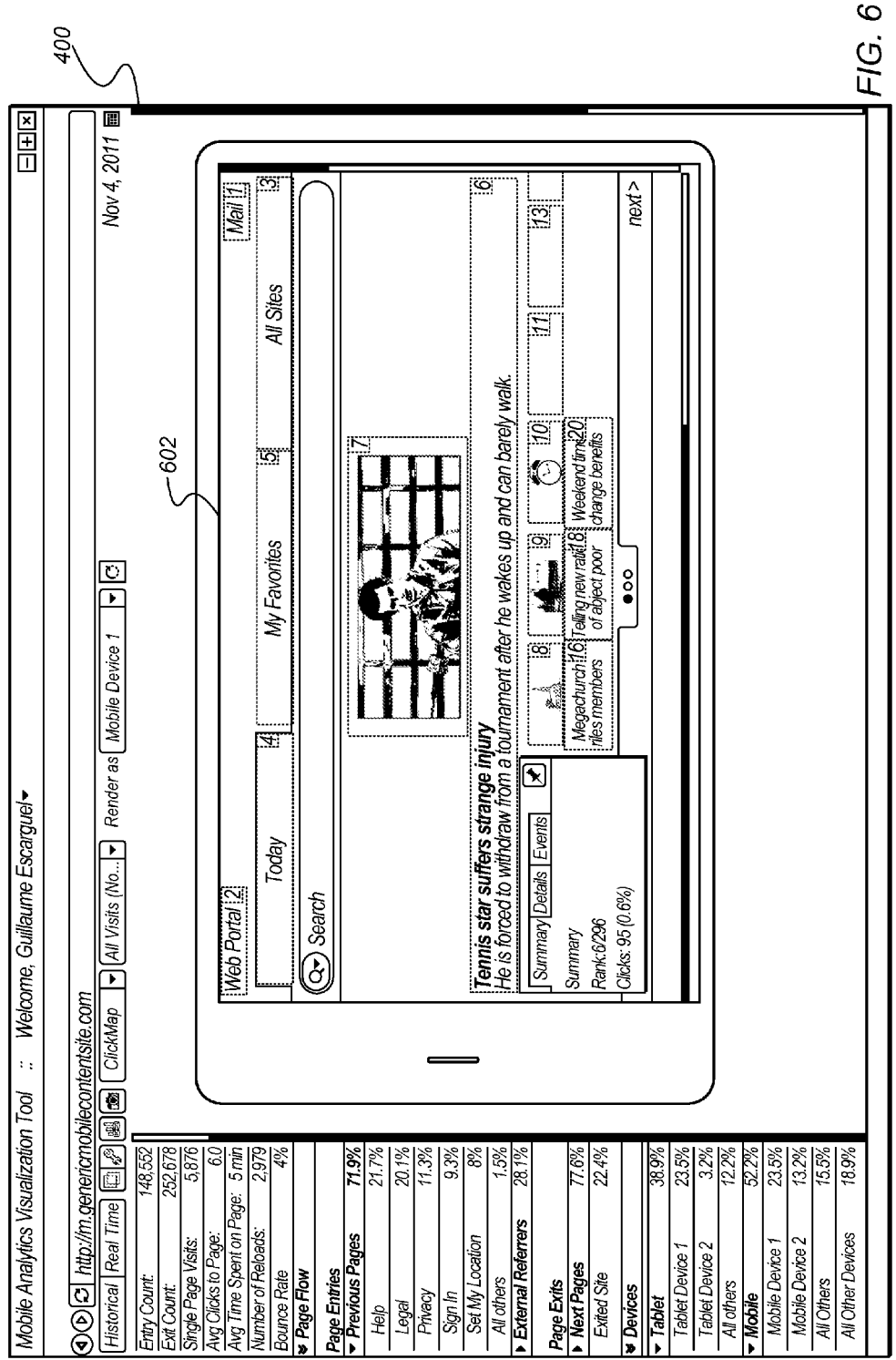
FIG. 6 depicts an illustration of an analytics visualization tool displaying content in a landscape mode according to a specific device, according to some embodiments.

FIG. 6, similar to FIG. 5, depicts an illustration, according to one embodiment, of a generated display 602 of a content page overlaid with analytics data according to a device, where the display may be generated in an embodiment of an analytics visualization tool.

In this embodiment, the content page is the same content page as in FIG. 5, however, in FIG. 6 the content page is displayed in landscape mode, where the content page in FIG. 5 is displayed in portrait mode. The ability of the analytics visualization tool to simulate each display capability of a given device allows a developer to have a true sense of a user experience for the given device.

In some embodiments, the generated display of a content page may be toggled between portrait mode and landscape mode, for example with a user click of a portrait/landscape icon. In other embodiments, a user may click and drag within an area of the displayed form factor in order to reorient the form factor accompanying the generated display from one mode to another mode. In this way, a user may simulate a physical tilting of a device.

Figure 7:
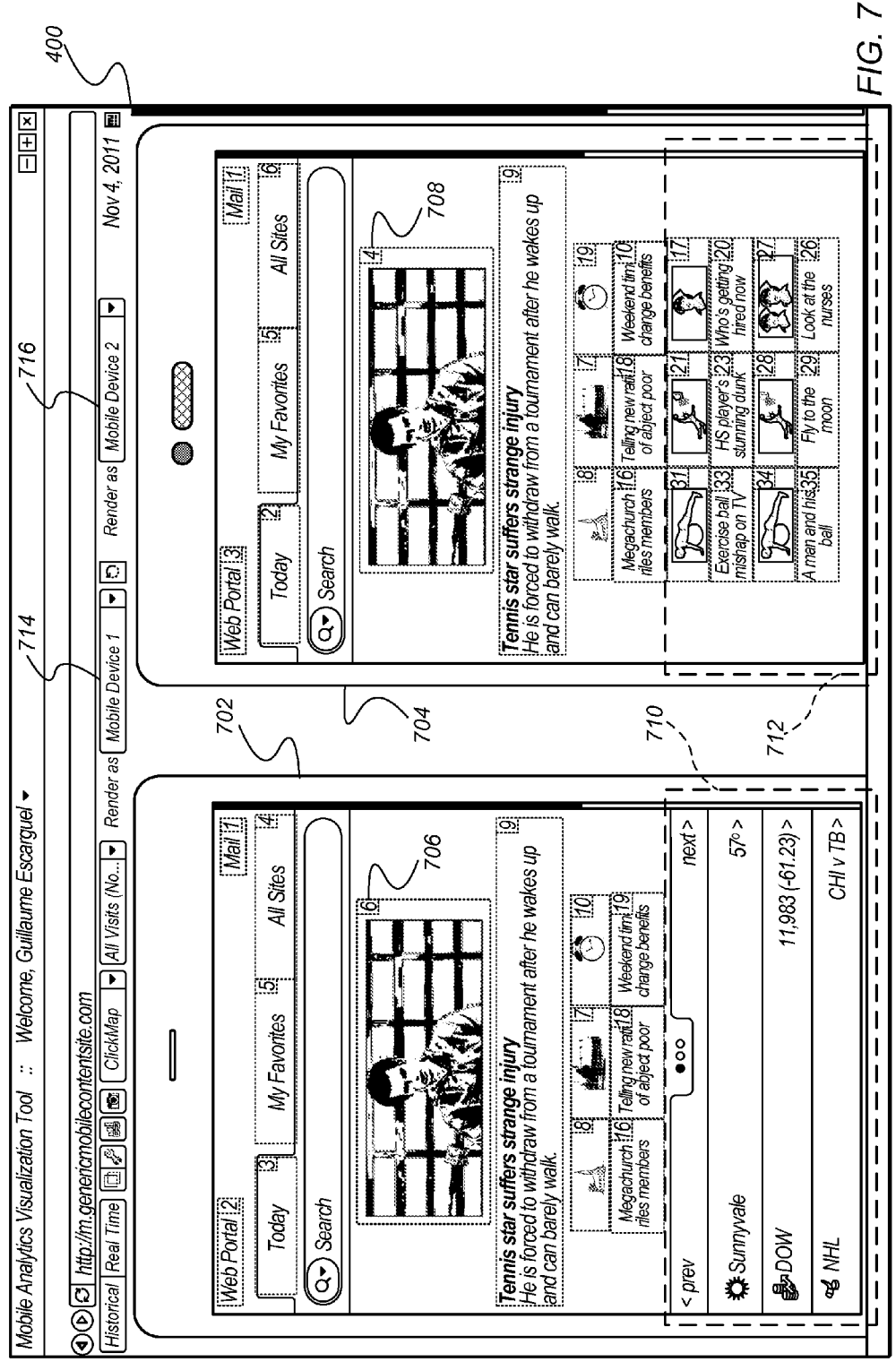
FIG. 7 depicts an illustration of an analytics visualization tool displaying a content page according to a first specific device and displaying the same content page according to a second specific device, according to some embodiments.

FIG. 7, according to one embodiment, depicts displays for two devices side by side. Such a display of multiple devices, simultaneously, may provide a developer with the ability to compare how different users experience the same content on different devices. In some cases, a user may opt to compare two devices, such as a smart phone against a tablet device, or some mobile device against a desktop system. In other cases, a user may opt to compare all content versions corresponding to a particular Internet browser application against all versions corresponding to a different Internet browser application.

Further, more than two devices of any kind may be displayed and compared, with the option of allowing manipulation of the sizes or locations of the generated displays to accommodate the available analytics visualization tool screen space. In some cases, a user may resize a generated display, for example through a click and drag motion over a corner of the generated display, similar to resizing a standard window.

In this example, form factor 702 corresponds to Mobile Device 1, as selected from menu 714, and form factor 704 corresponds to Mobile Device 2, as selected from menu 716. Each display for each respective device is generated as described above with regard to FIG. 4, where the display of a content page is overlaid with analytics data segmented according to a device and the content page. However, the analytics data for each respective device may be different, reflecting different patterns of consumption of content. For example, overlay 706 for Mobile Device 1, corresponding to an image link, has a ranking value in the overlay of 6. By contrast, in this example, overlay 708 for Mobile Device 2, corresponding to the same image link, has a ranking value of 4.

Further in this example, different amounts of the content page are visible for the different devices. In this example, screen and display area 710 for Mobile Device 1 includes different viewable elements than screen and display area 712 for Mobile Device 2. Even though both devices are displaying the same content page, a portion of the screen for Mobile Device 1 is devoted to displaying navigational controls and to displaying updates of other system applications, such as the weather, a stock report, and a sports update. By contrast, in this example, Mobile Device 2 devotes the entire screen area to displaying the content page, resulting in a greater portion of the content page being visible to a user. Such differing viewing characteristics of the different devices, along with the corresponding analytics data, may allow a developer to understand how to best tailor the organization of content for respective devices.

In some embodiments, as discussed above, a user may navigate the links of the display area within the analytics visualization tool. Given that the same content page is being displayed within the multiple devices, a user may choose to enable mirrored navigation. With mirrored navigation, if a developer clicks on a link within the display area in Mobile Device 1, the generated display for Mobile Device 1 may be updated to reflect navigation to a new content page, and in response to the same click and selection of the link in the display area of Mobile Device 1, the generated display for Mobile Device 2 may be updated to reflect navigation to the same link. In this way, a developer may always view the same content pages on the respective devices while only navigating along any one device. In some cases a developer may want to navigate a single device without mirrored navigation of another device, and therefore, the mirrored navigation feature may be disabled.

Figure 8:
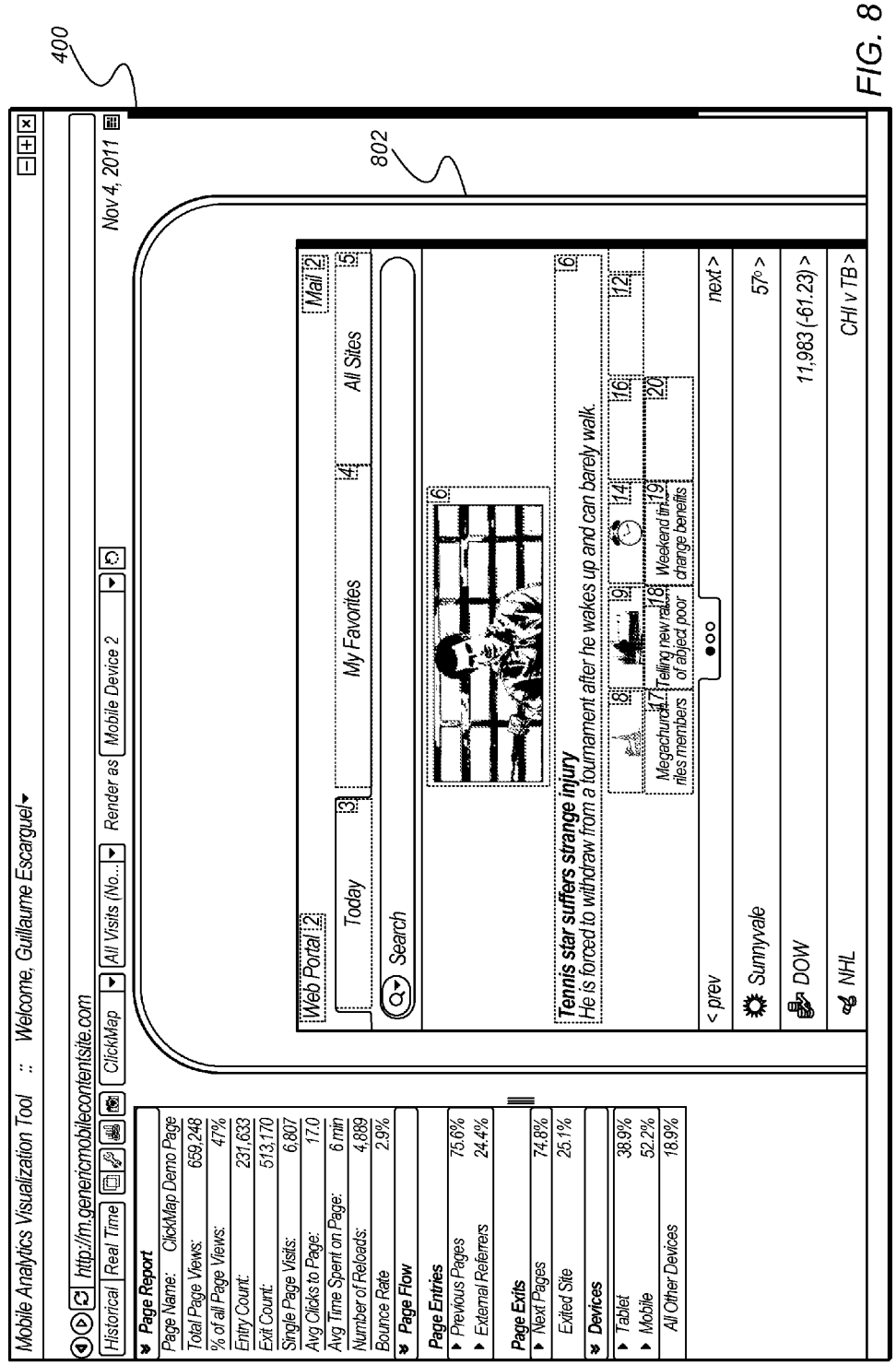
FIG. 8 depicts an illustration of an analytics visualization tool displaying a content according to a specific device while preserving the screen resolution of the specific device, according to some embodiments.

FIG. 8, according to one embodiment, depicts a display of a device that has a higher screen resolution than the screen onto which the analytics visualization tool interface is displayed. In such a case, it may not be possible to generate a display within the analytics visualization tool that is to scale with the device selected.

One option for a user is to view the generated display for the device at a reduced screen resolution to preserve the true scale of the form factor of the device. Another option for a user is to increase the size of the generated display for the device, as in form factor 802, in order to preserve the screen resolution of the device.

As noted above, a generated display may not be to scale, which may result in a generated display not entirely fitting within the available screen area of a display. In such a case, only a portion of the content page may be displayable. In order to increase the viewing area of the analytics visualization tool, a user may choose to eliminate the display of the form factor and to see only the generated display of the screen area of a given device.

In some embodiments, a user may also hide the panels and other user interface elements of the analytics visualization tool in order to see only the generated display within a minimal, bare outline of a window. This may be useful if a user is accessing the analytics visualization tool from a device and may wish to view a generated display without the user interface elements of the analytics visualization tool. In one case, the analytics visualization tool may be installed on the device as an application. In other cases, the analytics visualization tool may be installed on a server and accessible from the device from the device's web browser. Similar to the above discussion on navigating the generated display, a user of the analytics visualization tool may also navigate a generated display. For example, to navigate to a link, a user may tap and hold over a link in the generated display, and to interact with an overlay, the user may simply tap to view and interact with the analytics data.

Example Embodiment: Cloud Computing Environment

Figure 9:
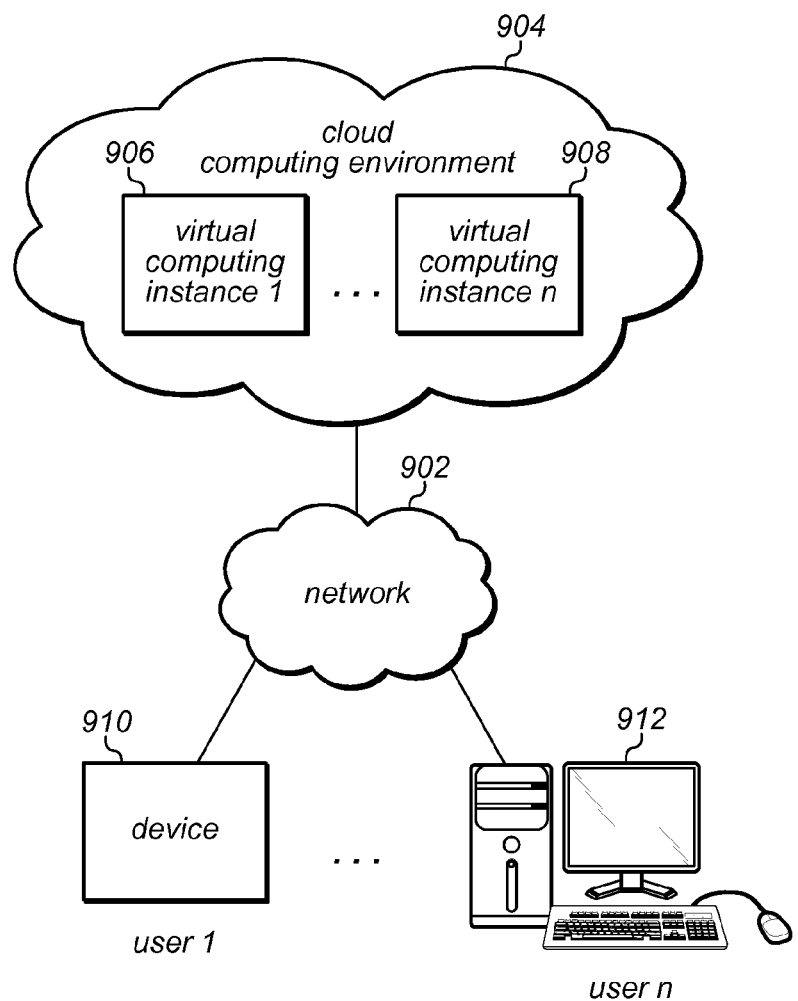
FIG. 9 depicts an illustration of a cloud computing environment that may be used in some embodiments.

FIG. 9 depicts one possible computing environment that includes a device 910 accessing a cloud computing environment 904 over network 902. In this example, an installed application on a device may be used to access any of the above-discussed embodiments of an analytics visualization tool executing within one of the virtual computing instances 906 through 908. Further, in some embodiments, different combinations of the above-discussed computational elements of an analytics visualization tool may be implemented locally on device 910 and remotely within one of the virtual computing instances 906 through 908.

In other embodiments, the analytics visualization tool may be implemented on a computer 912 accessing a cloud computing environment 904 over network 902. In this example, a user may log in to the cloud computing environment 904 to access a virtual computing instance within which an embodiment of the analytics visualization tool is executing or may be executed. Further, in some embodiments, different combinations of the above-discussed computational elements of an analytics visualization tool may be implemented locally on computer 912 and remotely within one of the virtual computing instances 906 through 908.

Example Computer System

Figure 11:
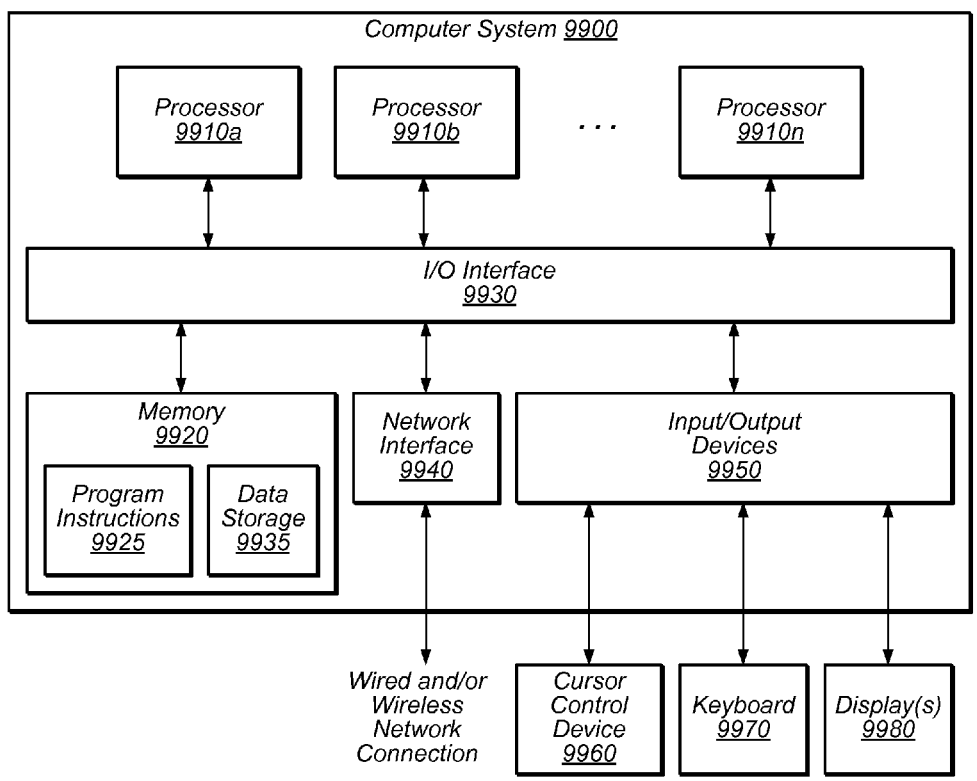
FIG. 11 depicts elements of an example computer system capable of implementing an analytics visualization tool.

FIG. 11 illustrates computer system 9900 that may execute the embodiments discussed above. In different embodiments, the computer system may be any of various types of devices, including, but not limited to, a personal computer system, desktop computer, laptop, notebook, or netbook computer, mainframe computer system, handheld computer, workstation, network computer, a camera, a set top box, a device, a consumer device, video game console, handheld video game device, application server, storage device, a television, a video recording device, a peripheral device such as a switch, modem, router, or in general any type of computing or electronic device.

In one embodiment, computer system 9900 includes one or more processors 9910*a*-9910*n* coupled to system memory 9920 via input/output (I/O) interface 9930. The computer system further includes network interface 9940 coupled to I/O interface 9930, and one or more input/output devices 9950, such as cursor control device 9960, keyboard 9970, and one or more displays 9980. In some embodiments, it is contemplated that embodiments may be implemented using a single instance of a computer system, while in other embodiments may be implemented on multiple such systems, or multiple nodes making up a computer system, may be configured to host different portions or instances of embodiments. For example, in one embodiment some elements may be implemented via one or more nodes of the computer system that are distinct from those nodes implementing other elements.

In various embodiments, the computer system may be a uniprocessor system including one processor, or a multiprocessor system including several processors (e.g., two, four, eight, or another suitable number). The processors may be any suitable processor capable of executing instructions. For example, in various embodiments, the processors may be general-purpose or embedded processors implementing any of a variety of instruction set architectures (ISAs), such as the x86, PowerPC, SPARC, or MIPS ISAs, or any other suitable ISA. In multiprocessor systems, each of processors may commonly, but not necessarily, implement the same ISA.

In some embodiments, at least one processor may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the content object processing methods disclosed herein may, at least in part, be implemented with program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory within the computer system may be configured to store program instructions and/or data accessible from a processor. In various embodiments, the system memory may be implemented using any suitable memory technology, such as static random access memory (SRAM), synchronous dynamic RAM (SDRAM), nonvolatile/Flash-type memory, or any other type of memory. In the illustrated embodiment, program instructions and data may implement desired functions, such as those described above for the various embodiments are shown stored within system memory 9920 as program instructions 9925 and data storage 9935, respectively. In other embodiments, program instructions and/or data may be received, sent or stored upon different types of computer-accessible media or on similar media separate from system memory or the computer system. Generally, a computer-accessible medium may include storage media or memory media such as magnetic or optical media, e.g., disk or CD/DVD-ROM coupled to the computer system via the I/O interface. Program instructions and data stored via a computer-accessible medium may be transmitted from transmission media or signals such as electrical, electromagnetic, or digital signals, which may be conveyed via a communication medium such as a network and/or a wireless link, such as may be implemented via the network interface.

In one embodiment, the I/O interface may be configured to coordinate I/O traffic between the processor, the system memory, and any peripheral devices in the device, including a network interface or other peripheral interfaces, such as input/output devices. In some embodiments, the I/O interface may perform any necessary protocol, timing or other data transformations to convert data signals from one component into a format suitable for another component to use. In some embodiments, the I/O interface may include support for devices attached through various types of peripheral buses, such as a variant of the Peripheral Component Interconnect (PCI) bus standard or the Universal Serial Bus (USB) standard, for example. In some embodiments, the function of the I/O interface may be split into two or more separate components, such as a north bridge and a south bridge, for example. In addition, in some embodiments some or all of the functionality of the I/O interface, such as an interface to system memory, may be incorporated directly into the processor.

The network interface of the computer system may be configured to allow data to be exchanged between the computer system and other devices attached to a network, such as other computer systems, or between nodes of the computer system. In various embodiments, the network interface may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

The I/O devices may, in some embodiments, include one or more display terminals, keyboards, keypads, touchpads, scanning devices, voice or optical recognition devices, or any other devices suitable for entering or retrieving data from one or more computer systems. Multiple I/O devices may be present in the computer system or may be distributed on various nodes of the computer system. In some embodiments, similar I/O devices may be separate from the computer system and may interact with one or more nodes of the computer system through a wired or wireless connection, such as over the network interface.

The memory within the computer system may include program instructions configured to implement each of the embodiments described herein. In one embodiment, the program instructions may include software elements of embodiments of the modules discussed earlier. The data storage within the computer system may include data that may be used in other embodiments. In these other embodiments, other or different software elements and data may be included.

Those skilled in the art will appreciate that the computer system is merely illustrative and is not intended to limit the scope of the embodiments described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. The computer system may also be connected to other devices that are not illustrated, or instead may operate as a stand-alone system. In addition, the functionality depicted within the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read from an appropriate drive, various examples of which are described above. In some embodiments, instructions stored on a computer-accessible medium separate from the computer system may be transmitted via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally, a computer-accessible medium may include storage media or memory media such as magnetic or optical media such as disks or DVD/CD-ROM, volatile or non-volatile media such as RAM, ROM, flash drives, as well as transmission media or signals such as electrical, electromagnetic, or digital signals, conveyed via a communication medium such as network and/or a wireless link.

The various methods described herein represent example embodiments of methods. These methods may be implemented in software, hardware, or through a combination of hardware and software. The order of the method steps may be changed, and various elements may be added, reordered, combined, omitted, or modified.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer implemented method, comprising:
receiving a selection of a content page;
receiving a selection of a first device from among a plurality of devices;
receiving a selection of a second device from among the plurality of devices;
retrieving respective display characteristics associated with each of the first device and the second device from a data store storing information for the plurality of devices; and
simultaneously displaying:
at least a portion of a first version of the content page along with one or more elements of segmented analytics data associated with the at least a portion of the first version of the content page by simulating a rendering of the at least a portion of the first version of the content page on the first device, the first version of the content page being based on the display characteristics of the first device; and
at least a portion of a second version of the content page along with one or more elements of segmented analytics data corresponding to the second device by simulating a rendering of the at least a portion of the second version of the content page on the second device, the second version of the content page being based on display characteristics of the second device,
wherein the displaying enables comparison of the first and second versions of the content page.

2. The computer implemented method of claim 1, wherein the display characteristics include one or more of a screen size, a screen resolution, and an aspect ratio, and wherein the displaying at least a portion of a first version of the content page comprises overlaying the one or more elements of the segmented analytics data onto corresponding links displayed within the at least a portion of the first version of the content page.

3. The computer implemented method of claim 2, further comprising:
displaying, within a visually distinct area of an overlay, one or more elements of the segmented analytics data corresponding to one or more devices other than the first device; and
displaying at least a portion of another version of the content page along with the one or more elements of segmented analytics data corresponding to the one or more devices by simulating a rendering of the at least a portion of the another version of the content page on the one or more devices, the another version of the content page being based on respective display characteristics of the one or more devices.

4. The computer implemented method of claim 1, further comprising:
determining the one or more elements of the segmented analytics data based at least in part on segmenting analytics data according to the:
content page; and
first device.

5. The computer implemented method of claim 1, further comprising:
prior to receiving the selection of the first device, providing a list of the plurality of devices within a user interface, wherein the first device and the second device are among the list of the plurality of devices.

6. The computer implemented method of claim 1, further comprising:
receiving a selection of another device from among the plurality of devices;
retrieving display characteristics of the another device from the data store; and
displaying at least a portion of another version of the content page in a separate area along with overlaid elements of the segmented analytics data associated with the at least a portion of the another version of the content page by simulating a rendering of the at least a portion of the another version of the content page on the another device, wherein the simulating is based on the display characteristics of the another device.

7. The computer implemented method of claim 1, further comprising:
determining the selection of the first device based at least in part on devices identified as having previously accessed the content page and ranking data from among segmented analytics data for the plurality of devices.

8. The computer implemented method of claim 7, wherein determining the selection of the first device is based at least in part on an element of the segmented analytics data corresponding to the first device other than ranking data.

9. The method of claim 1, further comprising:
displaying, within a visually distinct area of an overlay, one or more elements of the segmented analytics data corresponding to another device; and
displaying at least a portion of a different version of the content page along with the one or more elements of segmented analytics data corresponding to the another device by simulating a rendering of the at least a portion of the different version of the content page on the another device, the different version of the content page being based on display characteristics of the another device.

10. A non-transitory computer-readable storage medium having instructions stored thereon that, if executed by a computer, cause the computer to perform operations comprising:
receiving a selection of a content page;
receiving a selection of a first device from among a plurality of devices;
receiving a selection of a second device from among the plurality of devices;
retrieving respective display characteristics associated with each of the first device and the second device from a data store storing information for the plurality of devices; and
simultaneously displaying:
at least a portion of a first version of the content page along with one or more elements of segmented analytics data associated with the at least a portion of the first version of the content page by simulating a rendering of the at least a portion of the first version of the content page on the first device, the first version of the content page being based on the display characteristics of the first device; and
at least a portion of a second version of the content page along with one or more elements of segmented analytics data corresponding to the second device by simulating a rendering of the at least a portion of the second version of the content page on the second device, the second version of the content page being based on display characteristics of the second device, wherein the displaying enables comparison of the first and second versions of the content page.

11. The non-transitory computer-readable storage medium of claim 10, wherein the display characteristics include one or more of a screen size, a screen resolution, and an aspect ratio, and wherein the displaying at least a portion of a first version of the content page comprises overlaying the one or more elements of the segmented analytics data onto corresponding links displayed within the at least a portion of the first version of the content page.

12. The non-transitory computer-readable storage medium of claim 10, the operations further comprising:
displaying, within a visually distinct area of an overlay, one or more elements of the segmented analytics data corresponding to one or more devices other than the first device; and
displaying at least a portion of another version of the content page along with the one or more elements of segmented analytics data corresponding to the one or more devices by simulating a rendering of the at least a portion of the another version of the content page on the one or more devices, the another version of the content page being based on respective display characteristics of the one or more devices.

13. The non-transitory computer-readable storage medium of claim 10, the operations further comprising:
determining the one or more elements of the segmented analytics data based at least in part on segmenting analytics data according to the:
content page; and
first device.

14. The non-transitory computer-readable storage medium of claim 10, the operations further comprising:
prior to receiving the selection of the first device, providing a list of the plurality of devices within a user interface, wherein the first device and the second device are among the list of the plurality of devices.

15. The non-transitory computer-readable storage medium of claim 10, the operations further comprising:
receiving a selection of another device from among the plurality of devices;
retrieving display characteristics of the another device from the data store; and
displaying at least a portion of another version of the content page in a separate area along with overlaid elements of segmented analytics data associated with the at least a portion of the another version of the content page by simulating a rendering of the at least a portion of the another version of the content page on the another device, wherein the simulating is based on the display characteristics of the another device.

16. A system, comprising:
a processor; and
a memory having instructions stored thereon that, if executed by the processor, cause the processor to:
receive a selection of a content page;
receive a selection of a first device from among a plurality of devices;
receive a selection of a second device from among the plurality of devices;
retrieve respective display characteristics associated with each of the first device and the second device from a data store storing information for the plurality of devices; and
simultaneously display;
at least a portion of a first version of the content page along with one or more elements of segmented analytics data associated with the at least a portion of the first version of the content page by simulating a rendering of the at least a portion of the first version of the content page on the first device, the first version of the content page being based on the display characteristics of the first device; and
at least a portion of a second version of the content page along with one or more elements of segmented analytics data corresponding to the second device by simulating a rendering of the at least a portion of the second version of the content page on the second device, the second version of the content page being based on display characteristics of the second device,
wherein the displaying enables comparison of the first and second versions of the content page.

17. The system of claim 16, wherein the one or more elements of the segmented analytics data are overlaid onto corresponding links displayed within the at least a portion of the first version of the content page.

18. The system of claim 16, wherein the instructions further comprise instructions that, if executed by the processor, cause the processor to:
display, within a visually distinct area of an overlay, one or more elements of the segmented analytics data corresponding to one or more devices other than the first device; and
display at least a portion of another version of the content page along with the one or more elements of segmented analytics data corresponding to the one or more devices by simulating a rendering of the at least a portion of the another version of the content page on the one or more devices, the another version of the content page being based on respective display characteristics of the one or more devices.

19. The system of claim 16, wherein the instructions further comprise instructions that, if executed by the processor, cause the processor to:
determine the one or more elements of the segmented analytics data based at least in part on segmenting analytics data according to the:
content page; and
first device.

20. The system of claim 16, wherein the instructions further comprise instructions that, if executed by the processor, cause the processor to:
prior to receiving the selection of the first device, provide a list of the plurality of devices within a user interface, wherein the first device and the second device are among the list of the plurality of devices.

21. The system of claim 16, wherein the instructions further comprise instructions that, if executed by the processor, cause the processor to:
receive a selection of another device from among the plurality of devices;
retrieve display characteristics of the another device from the data store; and
display at least a portion of another version of the content page in a separate area along with overlaid elements segmented analytics data by simulating a rendering of the at least a portion of the another version of the content page on the another device, wherein the simulating is based on the display characteristics of the another device.

* * * * *